United States Patent
Rautila et al.

(10) Patent No.: US 6,631,183 B1
(45) Date of Patent: Oct. 7, 2003

(54) OPERATING MODE DEPENDENT GREETING MESSAGE

(75) Inventors: Heikki Rautila, Espoo (FI); Kai Öistämö, Espoo (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/270,454

(22) Filed: Mar. 17, 1999

(30) Foreign Application Priority Data

Mar. 19, 1998 (FI) .................................. 980614

(51) Int. Cl.$^7$ ................................ H04M 1/64
(52) U.S. Cl. .................... 379/88.22; 455/413
(58) Field of Search .................. 379/67.1, 88.19, 379/88.2, 88.21, 88.22, 88.23, 142.01; 455/412, 413, 414, 418, 419

(56) References Cited

U.S. PATENT DOCUMENTS

| | | | |
|---|---|---|---|
| 4,625,081 A | | 11/1986 | Lotito et al. ................ 379/88 |
| 5,329,578 A | * | 7/1994 | Brennan et al. ........ 379/211.03 |
| 5,434,908 A | * | 7/1995 | Klein ..................... 379/88.23 |
| 5,479,476 A | | 12/1995 | Finke-Anlauff ............. 379/58 |
| 5,581,604 A | | 12/1996 | Robinson et al. ............. 379/67 |
| 5,742,910 A | * | 4/1998 | Gallant et al. .............. 455/550 |
| 5,799,255 A | | 8/1998 | Berg et al. ................. 455/551 |
| 5,812,950 A | * | 9/1998 | Tom ........................... 455/440 |
| 5,832,062 A | * | 11/1998 | Drake ..................... 379/88.16 |
| 5,893,032 A | * | 4/1999 | Maeda et al. .............. 455/412 |
| 5,903,845 A | * | 5/1999 | Buhrmann et al. ..... 379/211.02 |
| 5,933,778 A | * | 8/1999 | Buhrmann et al. ......... 455/461 |
| 6,226,358 B1 | * | 5/2001 | Schwartz et al. .......... 379/67.1 |
| 6,226,379 B1 | * | 5/2001 | Swan et al. ................. 379/373 |
| 6,275,690 B1 | * | 8/2001 | Higuchi et al. ............... 379/80 |
| 6,295,341 B1 | * | 9/2001 | Muller .................... 379/88.18 |
| 6,298,228 B1 | * | 10/2001 | Singh ........................ 455/403 |
| 6,310,947 B1 | * | 10/2001 | Polcyn .................. 379/211.01 |

FOREIGN PATENT DOCUMENTS

| | | |
|---|---|---|
| EP | 0 399 520 | 11/1990 |
| FI | 101661 | 7/1997 |
| GB | 2 322 768 A | 9/1998 |
| WO | WO 97/41654 | 11/1997 |
| WO | WO 98/23111 | 5/1998 |
| WO | WO 99/39490 | 8/1999 |

OTHER PUBLICATIONS

"Digital cellular telecommunications system; Unstructured Supplementary Service Data (USSD)—Stage 1" (GSM 02.90) Mar. 1997, Version 5.1.0.

* cited by examiner

*Primary Examiner*—Scott L. Weaver
(74) *Attorney, Agent, or Firm*—Perman & Green, LLP

(57) ABSTRACT

In order to record and play spoken messages in a voice mail system, there are implemented steps where there is recorded (305) a first greeting message and a second greeting message corresponding to at least two operating modes of the terminal of a given subscriber, in the voice mail system, there is received (308) information as to in which operating mode the terminal of a given subscriber is set, and as a response to a call that is transferred to the voice mail system, there is played (302) a greeting message which is selected on the basis of the earlier received information as to in which operating mode the terminal of a given subscriber is set.

6 Claims, 4 Drawing Sheets

US 6,631,183 B1

OPERATING MODE DEPENDENT GREETING MESSAGE

TECHNOLOGICAL FIELD

In general, the invention relates to controlling the automatic answering service of a telephone system. In particular, the invention relates to a method and apparatus by means of which the operation of the answering service can be adapted to the users' varying needs in different usage situations.

BACKGROUND OF THE INVENTION

Telephone systems use both automatic answering machines provided in connection with mobile terminals and centralised automatic answering services that are called voice mail systems. Particularly in mobile communication systems, it is advantageous to realise answering services in a centralised fashion in a telephone exchange maintained by an operator, or in some other arrangement which is permanently connected to the network. In a typical voice mail system, the users record in advance a chosen greeting message in the system memory by dialling a specific number reserved for this purpose and by dictating their message. When a certain subscriber is not reached by phone, and the incoming call is transferred to the voice mail system, the system plays the recorded greeting message to the caller and gives a chance to leave a message to the voice mail box of the person whom the caller tried to reach.

A drawback in the use of an ordinary voice mail system is that the caller does not know the duration of the probable lapse of time until the subscriber next time listens to the left messages. The subscriber may be unavailable only for a lunch break or a short meeting, or he may be away for several days. If the voice mail system could inform the caller as to when his message will be received, he could formulate the message accordingly.

Naturally the voice mail box subscriber can call up the voice mail system and dictate a new greeting message every time when he knows the next probable opportunity to listen to the messages in the voice mail box. This, however, is troublesome and sometimes impossible: the subscriber may be in a meeting or in a concert, where talking aloud is not permitted.

SUMMARY OF THE INVENTION

The object of the present invention is to introduce a method and required equipment for easily adapting the voice mail system to different operating modes.

The objects of the invention are achieved by recording in the voice mail system in advance several different greeting messages, which correspond to the different operating modes, and by automating the communication to the voice mail system regarding a change in the operating mode.

The method according to the invention is characterised in that it comprises steps where in the terminal of a given subscriber, there are recorded at least two greeting messages, a first greeting message and a second greeting message, corresponding to at least two operating modes, in the voice mail system there is received information as to in which operating mode the terminal of a given subscriber is set, as a response to a call that is diverted to the voice mail system, there is played a greeting message chosen on the basis of the earlier received information as to in which operating mode the terminal of a given subscriber is set.

The invention also relates to a voice mail system and a telephone, characterised in that prior to selecting the greeting message of the voice mail system, the voice mail system obtains information as to in which operating mode the terminal is set.

According to the invention, a number of different operating modes can be defined for the subscriber's terminal, in accordance with the availability of the subscriber. For each subscriber of the system according to the invention, the voice mail system includes several memory locations, and in each location, the subscriber can record a different greeting message. The recorded greeting messages correspond to the operating modes of the terminal. The voice mail system functions so that when it has received information of the operating mode of the terminal, it selects, among the recorded greeting messages, the message corresponding to said operating mode. When a given call is diverted to the voice mail system, the selected greeting message is played to the caller.

In order to make the selection of the appropriate greeting message in the voice mail system as easy as possible for the subscriber, the terminal is programmed so that when the operating mode changes, the terminal automatically communicates the new mode to the voice mail system, without any other user operations than what is required for switching the operating mode. In form, the automatic message of a change in the operating mode can be for instance a short message service (SMS) message, an unstructured supplementary service data (USSD) message, or a dual tone multifrequency (DTMF) message transferred during a normal call.

The operating mode of the terminal may also change while the terminal is outside the network coverage, in which case the automatic message cannot be communicated to the voice mail system. In this case, the correct procedure can be secured in many ways. According to one alternative, the voice mail system always acknowledges the received automatic communications by sending a defined message of acknowledgement to the terminal. If the acknowledgement is not received, the terminal tries, from time to time, to retransmit the same communication, until it is received, and the terminal obtains a message of acknowledgement. Another alternative is that the terminal sends to the voice mail system an automatic communication of the operating mode at regular intervals irrespective of whether the operating mode has changed or not. A third alternative is that the terminal sends to the voice mail system an automatic communication of the operating mode always when the terminal is switched on, when its location changes and/or when there are other changes in its operation. When receiving a communication describing the operation of the terminal, the voice mail system always checks whether the selected greeting message corresponds to the operating mode indicated by said communication, and switches the selected greeting message when necessary.

BRIEF DESCRIPTION OF THE DRAWINGS

In the specification below, the invention is explained in more detail, with reference to the preferred embodiments described by way of example, and to the appended drawings, where.

DETAILED DESCRIPTION OF THE INVENTION

Figure 1A:
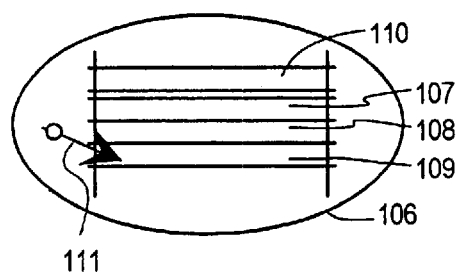
FIGS. 1a and 1b illustrate some details of FIG. 1.

In order to facilitate the understanding of the invention, we shall now first briefly explain known methods for exchanging information between a terminal in a cellular radio system and a given other device permanently connected to the network.

In many digital cellular radio systems, there are defined procedures for transmitting and receiving short, character string type messages, i.e. so-called short messages. In GSM (Global System for Mobile communications), the short message services are called SMS (Short Message Service). An essential characteristic of the short messages is that they can be addressed to a given subscriber in similar fashion as telephone calls, but a telephone connection need not be established in order to transmit them, because they are transmitted as signalling. In SMS, the maximum length of a character string contained in one message is 160 characters encoded by 7 bits. Detailed definitions for transmitting and receiving messages are given in the GSM specifications of the 02 series, and the publisher is ETSI (European Telecommunications Standards Institute)

In many digital telephone systems, there are also defined other procedures for transmitting and receiving such relatively short data messages where the content and structure is hardly restricted at all. In GSM, this system is represented by USSD (Unstructured Supplementary Service Data) services, which are defined in the GSM specification No. 02.90. A USSD message is a character string with certain codes at the beginning, and these codes define how the message should be treated. A USSD message sent by the terminal could for example be addressed to that network in which the terminal happens to operate at the moment in question (i.e. the VPLMN, Visiting Public Land Mobile Network), or to the terminal's home network (HPLMN, Home Public Land Mobile Network). The operator maintaining the network has fairly free hands to decide how the USSD messages, encoded in many different ways, are interpreted. The USSD messages can be transmitted to a given device connected to the network for instance by sending a request for switching a certain service on or off. In the GSM network, USSD messages are transmitted as signalling.

One way for transmitting relatively short data messages between a transmitting and a receiving device in a telephone network is DTMF (Dual Tone MultiFrequency) coding, where the numbers 0–9 and certain other characters can be presented in analogic form as combinations of two simultaneous oscillating periods with different frequencies. In between the transmitting and the receiving device, there is formed an ordinary telephone connection, and at both ends there is used a coding/decoding device, which in the transmitting device transforms the transmitted character string, character by character, to DTMF signals, and in the receiving device transforms the received successive DTMF signals back to characters. The telephone systems do not as such in any way restrict the contents of a message transmitted as DTMF encoded.

Figure 1:
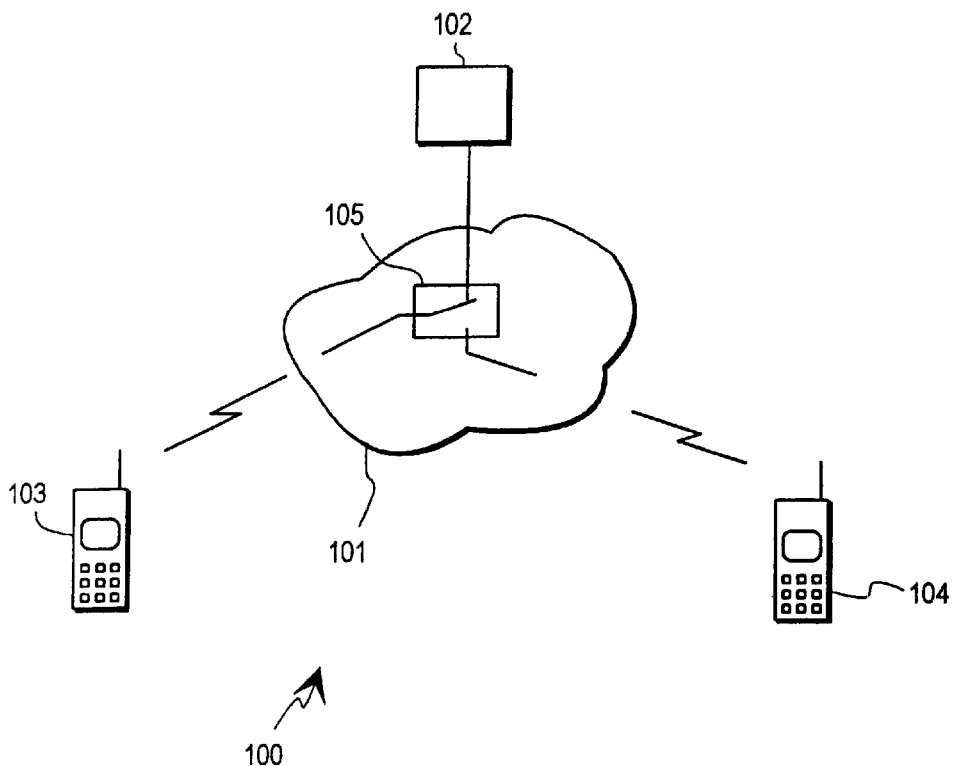
FIG. 1 illustrates a system according to the invention as a whole.
Figure 1B:
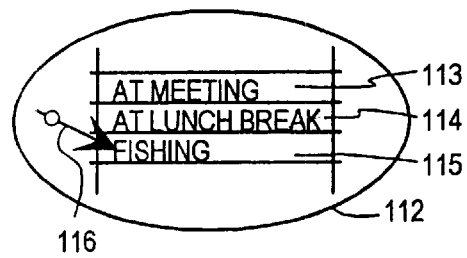

Next we shall explain the system according to the invention with reference to FIGS. 1, 1*a* and 1*b*. A digital telephone system 100 comprises a telephone network 101 and a connected voice mail system 102. In this system, there can be formed a data transmission connection between the telephone network and at least two separate telephone sets, which in the drawing are the caller's phone 103 and the subscriber's phone 104. In addition to its other parts, the telephone network 101 comprises switching means 105, known as such, for transferring the call to the voice mail system 102, when the subscriber does not answer the phone, when the subscriber's telephone 104 is switched off or when the subscriber has otherwise instructed the telephone system to divert incoming calls to the voice mail system.

According to FIG. 1*a*, the voice mail system 102 comprises a large amount of memory 106, which is divided into memory locations or blocks. For the subscriber's telephone 104, there are reserved certain memory locations, of which the drawing illustrates the memory location 107 for the first greeting message, the memory location 108 for the second greeting message and the memory location 109 for the third greeting message, as well as the memory location 110 for the messages left by the caller. The memory management system controlling the use of the memory 106 incorporates an indicator 111 for indicating which of the memory locations 107–109 of the greeting messages is being selected in each particular situation.

The subscriber's telephone 104 comprises, according to FIG. 1*b*, an operating mode memory 112 containing memory locations 113–115, where different operating modes of the terminal are defined. By way of example, the drawing presents operating modes such as "meeting" 113, "lunch break" 114 and "fishing" 115. The operating modes can be of a similar type as in the U.S. Pat. No. 5,479,476, where each operating mode corresponds to a chosen combination of telephone functions (lights on/off, key tones on/off, ringing tone low/high etc.), but this is not necessary from the point of view of the present invention. On the other hand, a typical feature of the present invention is that each operating mode defined by a given memory location 113–115 is a mode where the subscriber wishes the incoming calls to be transferred to the voice mail system. Moreover, each operating mode defined by a given memory location 113–115 is characterised by a given probable duration, i.e. a supposed time that will pass until the subscriber next time listens to the messages recorded in his voice mail box. For example, let us assume that when the operating mode set in the subscriber's telephone 104 is "lunch break", the subscriber probably listens to the messages recorded in his voice mail box no later than an hour after they were left, whereas the operating mode "fishing" means that the messages will not be listened to until the next workday. In the memory management system controlling the memory operations of the telephone, there is defined an indicator 116 for indicating which is the active operating mode in each situation.

By means of methods that will be explained in more detail below, the operation of the indicators 111 and 116 is synchronised so that when the indicator 116 indicates that the telephone is set in an operating mode corresponding to the memory location 113, the indicator 111 indicates that the memory location selected in the voice mail system is 107, and so on. For each operating mode of the telephone 104, there is reserved a memory location in the voice mail system memory 106. It is possible that one memory location of the voice mail system represents many different operating modes of the telephone, i.e. the telephone operating modes and the voice mail system memory locations correspond to each other on a one-way basis only. When the operating mode of the subscriber's telephone 104 changes, the telephone communicates, according to the invention, the new operating mode automatically to the voice mail system 102, in order to adjust the indicator 111 to indicate the memory location that corresponds to the new operating mode. When the caller tries to call on his telephone 103 to the subscriber and the call is diverted to the voice mail system, the caller hears the greeting message recorded in the memory location indicated by the indicator 111 and gets an idea of how soon the subscriber will probably listen to the left messages.

Figure 2:
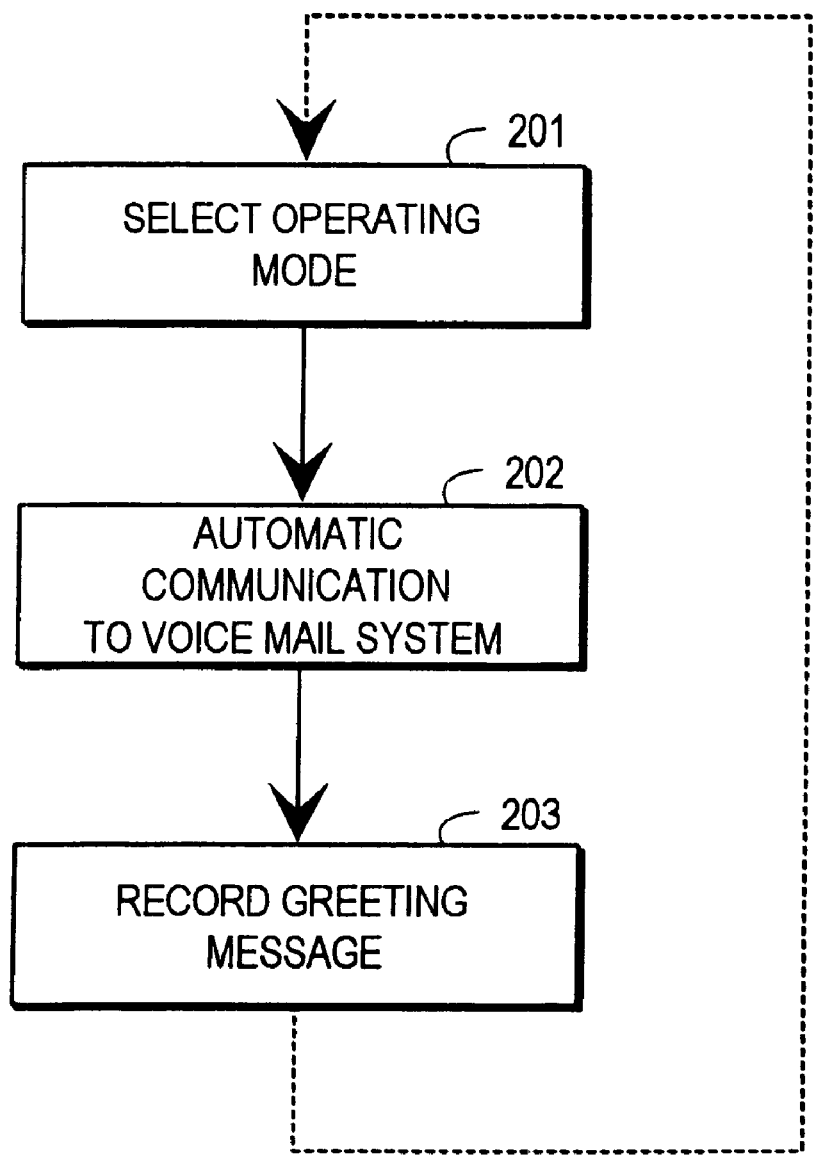
FIG. 2 illustrates the recording of the greeting messages according to the invention.

Next we shall explain how the subscriber records the desired messages in the different memory locations of the voice mail system. Here we refer to FIG. 2. The invention requires that at least two different operating modes are defined in the subscriber's telephone. The operations of a telephone are generally performed by means of menus, wherefore a natural solution for realising the selection of the operating modes is that a menu called "Select Operating Mode" is added to the menu structure. This menu can contain a number of operating mode alternatives, which can have names given by the telephone manufacturer and/or fed in by the subscriber himself. In order to select the operating mode, the subscriber looks up the respective menu on the telephone display and moves the cursor to the desired operating mode alternative. The invention is not as such restricted to the menu application, but the telephone can be provided with a separate operating mode selecting switch, or one side of the display can permanently show a selection of operating mode symbols, of which the subscriber can, by touching them or by moving the cursor, choose the desired operating mode, or then the selection process can be realised in some other fashion. In FIG. 2, the operating mode selection is carried out in block 201. In block 202, the subscriber's telephone sends to the voice mail system an automatic communication of a new operating mode. As was explained above, this communication can be a short message or a USSD message, composed and sent automatically by the telephone, or the telephone may automatically call the voice mail system and send a communication describing the change of operating mode as a DTMF coded character string.

In block 203, the subscriber dials that number of the voice mail system which is meant for dictating greeting messages, and dictates the desired greeting message basically in the same fashion as in known state-of-the-art voice mail systems. In block 202, the transmitted communication has caused the voice mail system to adjust the indicator, so that it indicates the memory location corresponding to the active operating mode of the subscriber's telephone. Thus the greeting message dictated in block 203 is recorded in the correct memory location. If the subscriber wants right away to dictate a new greeting message in a memory location corresponding to some other operating mode, the procedure illustrated in FIG. 2 can be repeated by returning from block 203 to block 210. If not, the operation is ended in the block 203 and restarts in the block 201 only when the subscriber next time wants to dictate a new greeting message in a memory location corresponding to one of the operating modes. The blocks 201 and 202 are not as such necessary for dictating a greeting message in the memory location corresponding to an operating mode which is already being selected in the telephone. However, the subscriber may wish to secure that the greeting message is recorded in the correct memory location, in which case it is always safe to start the recording of a new greeting message by selecting the operating mode according to FIG. 2.

Figure 3:
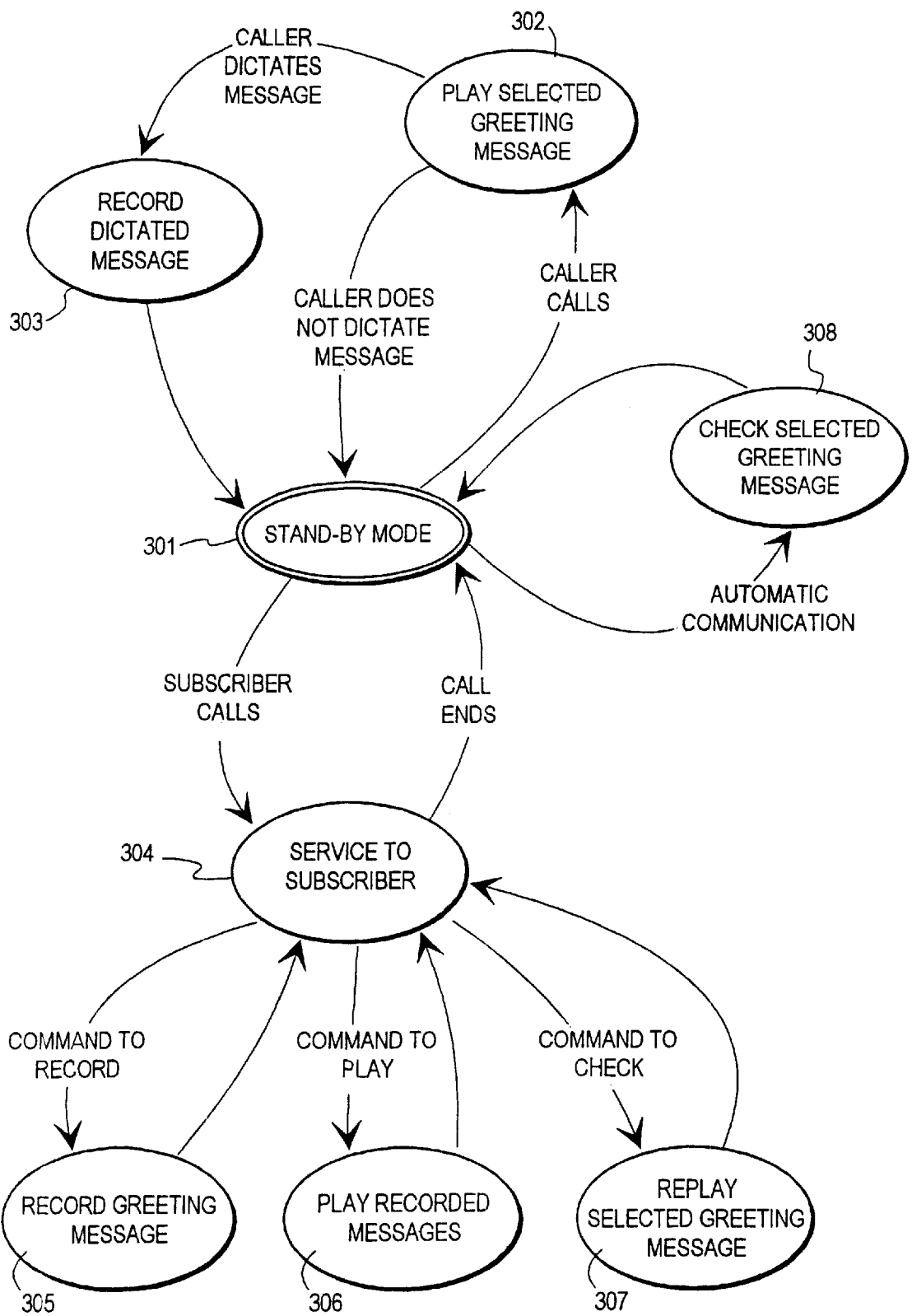
FIG. 3 illustrates the operation of the voice mail system according to the invention as a mode diagram.

FIG. 3 illustrates the operation of the voice mail system according to the invention as an operating mode diagram, with reference to the tasks that are connected to the maintenance of one voice mail box. In the stand-by mode 301, a given memory location containing a greeting message is chosen, and the system is waiting for a call that is transferred to the voice mail system—either a call that unsuccessfully tried to reach the subscriber, or the subscriber's call in order to listen to the left messages and/or to dictate a new greeting message, or a communication of a new operating mode sent by the subscriber's telephone. In order to make sure that at least one memory location always contains a recorded greeting message, the system can for a start record a given basic greeting message in all memory locations.

A transition to mode 302 takes place when the voice mail system receives a transferred call from a caller who tries to reach the subscriber. In mode 302, the voice mail system plays to the caller the greeting message that is recorded in the selected memory location. If the caller dictates a message in the subscriber's voice mail box, the stand-by mode is resumed via mode 303 corresponding to said operation; in other cases, the stand-by mode is resumed directly.

A transition from the stand-by mode 301 to mode 304 takes place when the subscriber calls the voice mail system. Generally the subscriber can control the operations of the voice mail system by means of keypress commands that are transmitted to the voice mail system as DTMF encoded. If the subscriber sends a command for recording a new greeting message, the system is switched to mode 305, where the voice mail system records the greeting message dictated by the subscriber in the selected memory location, and mode 304 is resumed. If in mode 304 the subscriber sends a command to listen to the messages left in his voice mail box, the system switches over to mode 306, where the voice mail system plays the recorded messages, and mode 304 is resumed. Further, in mode 304 the subscriber can send a command in order to check the recorded greeting messages, and in mode 307 the voice mail system plays the greeting message that is recorded in the selected memory location. A return from mode 304 to the stand-by mode 301 takes place when the subscriber closes the connection.

A transition from the stand-by mode 301 to mode 308 takes place when the subscriber's telephone sends to the voice mail system an automatic communication of a new operating mode. In mode 308 the voice mail system secures that the chosen greeting message memory location matches the new operating mode indicated in the communication. A return to the stand-by mode 301 takes place when the communication is received and an indicator is adjusted to indicate the new memory location (unless it already indicated said memory location).

Figure 4:
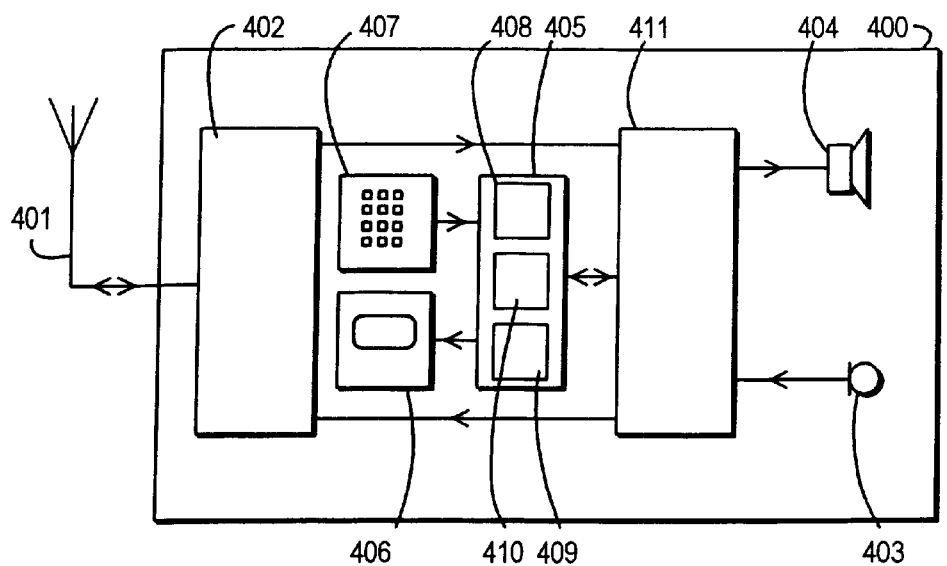
FIG. 4 is a schematical illustration of a terminal according to the invention.

FIG. 4 is a schematical illustration of a mobile phone 400 that can be used as a terminal according to the invention. To an antenna 401, there is connected a radio part 402 containing the necessary means for forming and maintaining a two-way radio connection between the mobile phone and the base station of a cellular radio system. From the radio part, there are provided connections, via a base frequency part 411, to a microphone 403 and a loudspeaker 404 in order to facilitate normal telephone operations, as well as to a data part 405, which in turn is connected to a display 406 and to a keypad 407. The data part 405 is arranged, in a way known as such, to process data received by radio transmission and to link the short messages, USSD messages, DTMF encoded messages and/or other data to be transmitted, as part of the information to be sent to the base station. The data part 405 comprises a memory 408, including, among others, an operating mode memory illustrated in FIG. 1, as well as a communications composition block 409 arranged to compose the automatic communications for informing the voice mail system of the changes in the operating modes of the mobile phone 400. The operation of the data part is controlled by a control block 410, which (like the communications composition block 409) is most advantageously realised by a microprocessor.

Figure 5:
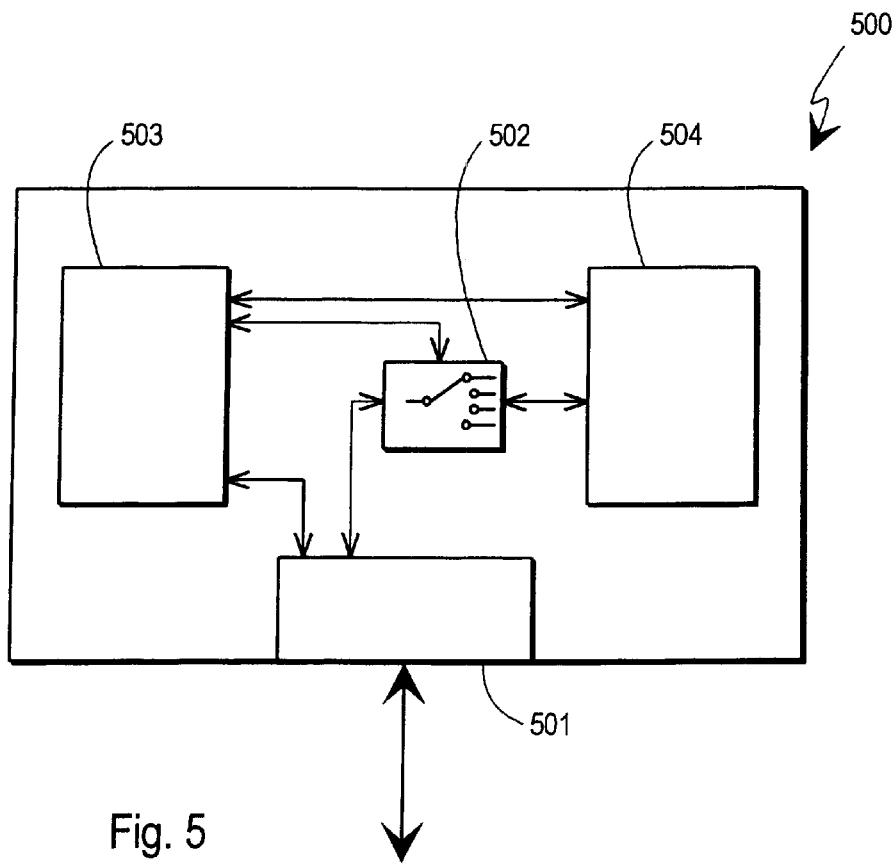
FIG. 5 is a schematical illustration of a voice mail system according to the invention.

FIG. 5 is a schematical illustration of a voice mail system 500 according to the invention, which is connected to a telephone network by intermediation of an interface 501. In FIG. 5 it is assumed that the voice mail system 500 is connected to a digital telephone network, where speech information is already transmitted in a form which as such is suitable to be recorded in electric memory devices. If this were not the case, the interface 501 should include the necessary means for transforming the received information into a recordable form, and respectively for transforming the recorded information read from the memory into such speech that could be further transmitted in a telephone network.

The switch block 502 operates under the control of the control block 503 and connects the interface 501 to that block of the memory 504 into which the dictated message should in each case be recorded, or from which the recorded message should be played for the callers. Thus the connection between the interface 501 and the memory 504, passing via the switch 502, is a two-way connection. The control block 503 receives the necessary information for controlling the switch 502 from the interface 501, on one hand in the form of automatic communications sent by the subscriber's telephone, and on the other hand on the basis of the timing factors: the position of the switch 502 must be changed for instance when the greeting message read from the selected memory location has been played to the caller, and it is time to record the message dictated by the caller in the voice mail box.

In the above specification, the invention is explained with reference to its simplest preferred embodiment and to the voice mail box of one subscriber only. In practical implementations, a voice mail system may include the voice mail boxes of even tens of thousands of subscribers, wherefore applications of the type described above must be provided with state-of-the-art equipment for each time focusing the operations exactly to the voice mail box and greeting messages of the subscriber in question.

The invention can be modified by adding other features than those described above. In an advanced preferred embodiment of the invention, it is observed how long the subscriber's telephone is set in each operating mode and/or how long it in each mode takes before the subscriber listens to the caller's message after it was left. In the former embodiment, the subscriber's telephone includes a timer for measuring for how long a given operating mode is chosen. The results from the measurements can only be recorded as regards the last occurrence of said operating mode, or then the recorded results can be averages of the earlier occurrences of said operating mode, being weighted in different ways. It is pointed out that the operating modes referred to in the invention are particularly those where the subscriber does not answer the telephone. If for example the subscriber's telephone has measured that the operating mode X lasts Y minutes in average, next time when the operating mode X begins, it can send the voice mail system an automatic communication: "Operating mode X begun, ends probably after Y minutes". If the voice mail system comprises a required speech synthetisizer, the greeting message connected to operating mode X can be for instance as follows: "Please leave a message, I will probably listen to it after [Z] minutes". Here Z means Y minutes minus the time that has passed since the voice mail system received the communication that the operating mode X was begun. In other words, the voice mail system includes a timer, and the set initial value of the timer is Y minutes when the communication of the beginning of the operating mode X is received, and it passes towards zero. The greeting message is otherwise identical with the message originally dictated by the subscriber, but in the spot which in the above description is marked with square brackets, the speech synthetisizer of the voice mail system announces the set value of the timer. The use of a timer can be avoided by recording the point of time when the automatic notice was received as well as the included estimation of the duration of the operating mode and by performing, at the arrival of each call, a simple calculation task as for the points of time.

A simpler preferred embodiment of the invention, which is connected to measuring the average or otherwise typical duration of an operating mode in the telephone, is an embodiment where the subscriber can check from his phone how long a given operating mode X usually has lasted. After checking this, the subscriber can check the time at the moment when the message is dictated and dictate a greeting message where he gives the next probable point of time when he will listen to left messages.

Further, on the basis of automatic timing, there can be introduced an embodiment where the voice mail system measures for how long the message dictated by the caller must in average wait in the voice mail box before the subscriber listens to it. The recorded average waiting times can be common to all operating modes of the subscriber's telephone, or they can be separately connected to each operating mode. When the next incoming call is transferred to the voice mail system, the system can read from the memory the recorded average waiting time and add it, by means of the speech synthetisizer, as part of the greeting message to be played for the caller.

In the above specification we maintained that the operating mode of a telephone or other terminal is changed only when the user actively selects a new operating mode. From the point of view of the present invention, this is by no means essential, but the operating mode can also be changed automatically (a given operating mode may for instance have a predetermined maximum duration, whereafter the telephone is automatically switched over to another operating mode) or by intermediation of some other external factor than the subscriber himself. For example, the telephone may observe under which network and/or in which location area it operates at each particular time. In third-generation network applications, where the employee's terminal operates, while in the office, in the office's own nano cellular network, the terminal may learn that while being in the nano cellular network area, it typically lasts a given period before the user next time listens to the messages left in his voice mail box, and this information can be utilised when selecting the appropriate greeting message for the operating mode in question.

In the above specification, only such solutions are dealt with where the voice mail system is implemented as part of a telephone exchange connected to a fixed network or of a similar apparatus. However, the invention can be fully implemented also in systems where the telephone answering machine or the voice mail system is technically arranged in connection with each separate terminal device. Now it is particularly easy to automatically inform the voice mail system of a change in the operating mode of the terminal, because this information need only be transmitted to a given other part of the same terminal.

In the above specification, the names and standards pertaining to certain systems are given by way of example only, and they do not restrict the implementation of the invention in any system.

What is claimed is:

1. A method for recording and playing spoken messages in a network voice mail system for a mobile terminal, comprising the steps of:

defining at least a first operating mode and a second operating mode for said mobile terminal by contents of certain memory locations in said terminal;

recording a first greeting message and a second greeting message in said network voice mail system, corresponding to at least one of said first and second operating modes of said mobile terminal; of a certain subscriber respectively, receiving a mode change information message from said mobile terminal in said network voice mail system, said mode change information message including information about a change of the operating mode into which said mobile terminal is set, wherein, said mode change information message is sent independently of an incoming call and as a response by said network voice mail system to a call transferred to said network voice mail system, playing a greeting message chosen on the basis of the information received earlier in said mode change information message.

2. A method according to claim 1, wherein the mode change information message is received in a form that is one of the following: a short message service (SMS) message, a unstructured supplementary service data (USSD) message, a dual tone multifrequency (DTMF) encoded message.

3. A network voice mail system for a mobile terminal comprising a memory in said network voice mail system for storing information about operating modes for said mobile terminal and recording greeting messages associated with said operating modes;

means in said mobile terminal for selecting an operating mode from said operating modes and transmitting a mode change information message including information about a change of the operating mode to said network voice mail system, wherein, said mode change information message is sent independently of an incoming call; and means in said network voice mail system for selecting one of said recorded greeting messages on the basis of the information received earlier in said mode change information message about the operating mode in which said mobile terminal is set.

4. A voice mail system according to claim 3, additionally comprising means for receiving said mode change information message in a form that is one of the following: a short message service (SMS) message, a unstructured supplementary service data (USSD) message, a dual tone multifrequency (DTMF) encoded message.

5. A mobile telephone arranged to selectively operate in one of at least two operating modes, comprising means for automatically transmitting in a mode change information message to a network voice mail system information about a change of the operating mode in which the telephone is operating in order to allow said network voice mail system to select a greeting message corresponding to said information as to said operating mode, wherein, said mode change information message is sent independently of an incoming call.

6. A telephone according to claim 5, comprising means for transmitting said mode change information message in a form that is one of the following: a short message service (SMS) message, a unstructured supplementary service data (USSD) message, a dual tone multifrequency (DTMF) encoded message.

* * * * *